Oct. 31, 1961  P. R. HARRIS  3,006,665
TELESCOPIC PIPE JOINT WITH MEANS TO
ASSURE RECTILINEAR MOVEMENT
Filed Feb. 16, 1959
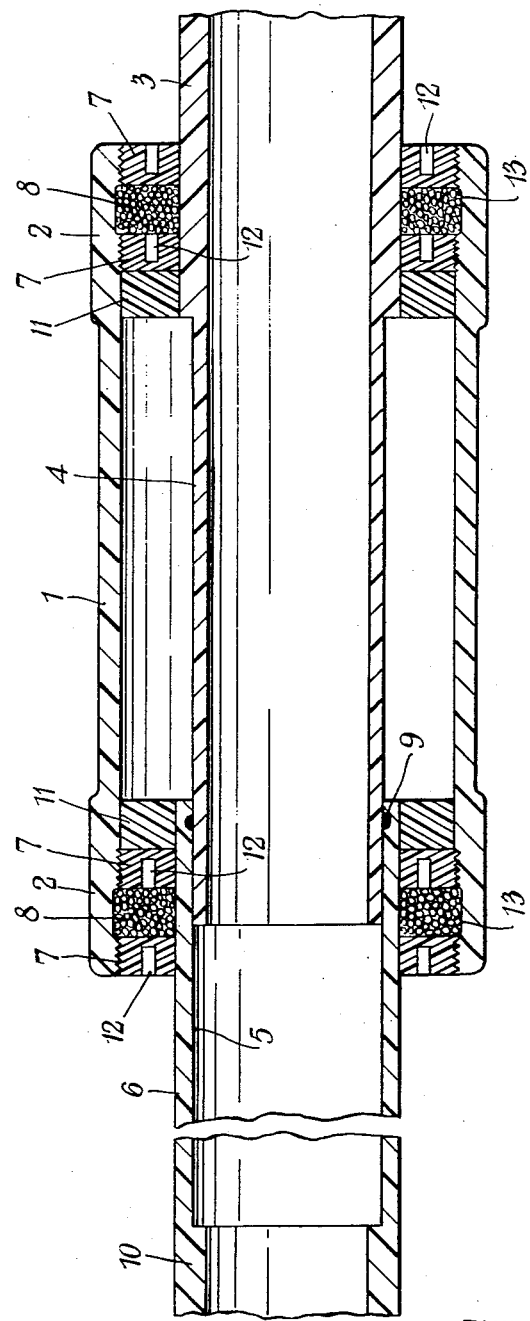
INVENTOR
PAUL RATLIFF HARRIS
BY
*Mivie & Smiley*
Attys.

United States Patent Office 3,006,665
Patented Oct. 31, 1961

3,006,665
TELESCOPIC PIPE JOINT WITH MEANS TO ASSURE RECTILINEAR MOVEMENT
Paul Ratliff Harris, "Trundles," 71 Park Ave., Eastbourne, England
Filed Feb. 16, 1959, Ser. No. 793,644
Claims priority, application Great Britain May 1, 1958
3 Claims. (Cl. 285—302)

This invention relates to expansion units for connecting lengths of synthetic plastic tubing or piping which may be subjected to changes of temperature over the whole or part of their length.

In fluid transmission systems or the like, considerable lengths of tubing may be required. When plastic tubing is employed, the rate of expansion with heat is of the order of eight times that of steel or iron tubing and special provision for expansion and contraction becomes necessary. With such lengths of tubing the usual rigid joints have to be supplemented at intervals by additional expansion units depending upon the heating and cooling conditions to be encountered.

Proposals have been put forward for connecting adjacent ends of two lengths of tubing to the ends of a sleeve of larger diameter encircling the tubing by means of a ring of packing material at each end of the sleeve held in position between two rings screwed into the sleeve.

The object of the present invention is to provide an expansion unit including a floating connecting sleeve particularly suitable for use with plastic tubing.

It is also an object of the invention to provide effective sealing means between the ends of the tubular members and the ends of a floating connecting sleeve.

The drawing is a section through the expansion unit illustrating same connecting two tubes together. An example of an expansion unit for a low pressure fluid transmission system is shown in the drawing applied to two tubes 3, 6 which telescope one within the other. An outer tubular member 1, of greater diameter than the plastic tubes to which it is applied, is shown formed at each end with a packing gland housing 2 of increased diameter through each of which is axially slidable one of the tubes 3, 6. The housings 2 may, however, be enlarged by an external plastic ring welded or secured adhesively on the outside of the member. Each packing gland includes two threaded annular plates 7 between which an annular mass of packing material 8 is located for creating a fluid tight joint. Each of the threaded plates 7 is provided with means for rotating it so that it enters the housing 2. Such means may comprise, for example, blind openings 12 into which a special spanner of known type may be inserted. The packing material 8 may be asbestos, string, hemp, or similar yieldable material. The threaded interior of each gland 2 is interrupted by a circular recess 13 for the packing material.

The telescoping of the tubes 3, 6 is effected by inter-engaging parts 4, 5 of reduced diameter so as to ensure a substantially uniform diameter of the bore. An initial sealing ring 9 between the two tubes 3, 6 enters a groove in the enlarged inner bore portion 5 of the tube 6 and engages the reduced outer portion 4 of the tube 3 so as to be slidable thereon.

The tubular member 1, the annular plates 7 and the stops 11 should be made of synthetic material having substantially the same coefficient of expansion with heat as the tubes 3, 6 to ensure satisfactory working over a wide range of temperature. The stops 11, which are secured to or are integral with the tubes 3, 6, limit the extension of the unit and prevent disconnection of the tubes by engagement with the inner annular plates 7. Similarly the stops 11 limit the contraction of the unit and the telescoping of the tubes by engagement with one another.

The ends of the tubes 3, 6 are connected by joints, not shown, with the adjacent lengths of the pipe line.

Expansion joints as disclosed herein are sensitive to small variations of temperature and will allow expansion and contraction to take place over a substantial length of tubing without leakage of fluid at pressures appropriate for use in tubing of synthetic plastic.

Although a certain specific embodiment of the invention has been shown and described, it is obvious that many modifications thereof are possible insofar as is necessitated by the prior art and by the spirit of the appended claims.

What is claimed is:

1. An expansion coupling for connecting the ends of tubes subject to large variations in length because of temperature changes in a fluid pressure system, comprising a pair of fluid conduction tubes slidably telescoped one within the other and being so constructed and arranged as to be mutually supporting, a tubular member of larger cross sectional dimension than the tubes and spaced radially from said tubes to extend over the telescoped end portions thereof, the interior surfaces of the end portions of the tubular member being interruptedly threaded dividing the threads at each end into two portions, a ring of packing material at each end of the tubular member between said threaded portions and engaging the exterior surface of a tube, a pair of circumferentially threaded annular plates threaded to said tubular member at each end and said ring of packing material positioned between said plates whereby threading the plates of each pair together radially expands the packing ring into sealing engagement with the tubular member and the corresponding tube, a first flange secured to the end of one of said tubes and extending radially to slidably engage the inner surface of the tubular member, a second flange secured to the other tube and spaced inwardly from the end thereof a distance nearly equal to the length of the tubular member, said second flange also extending radially to slidably engage the inner surface of the tubular member, both said first and second flanges being positioned within the confines of the tubular member to engage the innermost surface of the inner one of each pair of annular plates and limit separation of the tubes upon withdrawal movement of either telescoping tube, said flanges being engageable with each other to limit inward telescopic movement of either tube whereby said flanges serve not only as stops to limit such telescopic movements but also as bearing guides to assure rectilinear movement of the tubes and the tubular member upon movement of any one of them with respect to another.

2. An expansion coupling according to claim 1, wherein said threaded portions at each end of the tubular member are separated by an undercut circumferential recess, and said ring of packing material at each end of the tubular member being aligned with said recess and upon threading together of said pair of annular plates being in sealing engagement with the tubular member while seated in the recess.

3. An expansion coupling according to claim 1, wherein said pair of tubes is provided with a sealing ring on one of said tubes near the end thereof and disposed on the surface which engages the other tube to ensure a primary seal between said tubes.

References Cited in the file of this patent

UNITED STATES PATENTS

| | | |
|---|---|---|
| 327,281 | Letzkus | Sept. 29, 1885 |
| 760,790 | Holt | May 24, 1904 |
| 1,929,905 | Slotsky | Oct. 10, 1933 |
| 2,498,831 | Veitch | Feb. 28, 1950 |
| 2,533,097 | Dale | Dec. 5, 1950 |
| 2,759,743 | Bloom | Aug. 21, 1956 |
| 2,785,910 | Munger | Mar. 19, 1957 |

FOREIGN PATENTS

| | | |
|---|---|---|
| 10,570 | Great Britain | May 9, 1903 |
| 907,780 | France | July 23, 1945 |
| 1,140,958 | France | May 11, 1957 |